(12) United States Patent
Yu

(10) Patent No.: US 6,886,887 B2
(45) Date of Patent: May 3, 2005

(54) BICYCLE SADDLE

(76) Inventor: Tsai-Yun Yu, No. 1-2, Lane 1147, Sec. 1, Chung San Road, Ta Chia Chen, Taichung Hsien (TW)

(*) Notice: Subject to any disclaimer, the term of this patent is extended or adjusted under 35 U.S.C. 154(b) by 0 days.

(21) Appl. No.: 10/673,785

(22) Filed: Sep. 30, 2003

(65) Prior Publication Data

US 2005/0046245 A1  Mar. 3, 2005

(30) Foreign Application Priority Data

Aug. 27, 2003 (TW) .................................. 92215525

(51) Int. Cl.[7] .................................................. B62J 1/18
(52) U.S. Cl. .................... 297/214; 297/202; 297/195.1
(58) Field of Search ............................ 297/214, 195.1, 297/202, 452.41

(56) References Cited

U.S. PATENT DOCUMENTS

| | | | | |
|---|---|---|---|---|
| 3,997,214 A | * | 12/1976 | Jacobs ........................ 297/214 |
| 5,147,685 A | * | 9/1992 | Hanson ........................ 428/189 |
| 5,252,373 A | * | 10/1993 | Ganske et al. ................. 428/68 |
| 5,720,518 A | * | 2/1998 | Harrison ...................... 297/214 |
| 5,904,396 A | * | 5/1999 | Yates .......................... 297/214 |
| 5,911,475 A | * | 6/1999 | Nakahara ................ 297/219.11 |
| 6,136,426 A | * | 10/2000 | Bigolin .................... 428/319.3 |
| 6,450,572 B1 | | 9/2002 | Kuipers |

* cited by examiner

Primary Examiner—Laurie K. Cranmer
(74) Attorney, Agent, or Firm—Browdy and Neimark, P.L.L.C.

(57) ABSTRACT

A bicycle saddle is constructed to have a hard bottom shell, a first elastic layer made of foamed plastics and arranged at the top side of the hard bottom shell, a first covering covered on the first elastic layer over the hard bottom shell, and a second elastic layer covered on the first covering, the second elastic layer being formed of a layer of gel arranged at a top side of the first covering and a second covering covered on the layer of gel.

8 Claims, 2 Drawing Sheets

BICYCLE SADDLE

BACKGROUND OF THE INVENTION

1. Field of the Invention

The present invention relates to bicycle saddles and, more particularly, to a bicycle saddle having a gel layer on the top surface thereof.

2. Description of the Related Art

A conventional bicycle saddle is generally comprised of a hard shell, an elastic layer (normally of foamed plastic materials) arranged at the top surface of the shell, and a covering covered on the elastic layer. A problem that is common to the conventional bicycle saddle is that they are too soft or too hard.

The U.S. Pat. No. 6,136,426 discloses a prior art saddle for bicycle which comprises a filler covered by a covering layer. The filler is made of elastically yielding material and has in its inside at least one ornamental element. The covering layer is made of flexible laminar material and has at least one optically transparent zone through which the at least one ornamental element is visible. The filler comprises at least a first layer of uniformly transparent compound, for example, a uniformly transparent gel compound, and a second layer of foamed material. Such a bicycle saddle can provide a more comfortable ride to the riders but still has some drawbacks. Because the first layer of uniformly transparent gel compound is located in middle of the second layer of foamed material in a flush manner, the rider's hips are simultaneously rested on the first layer of uniformly transparent gel compound and the second layer of foamed material, i.e., the first layer of uniformly transparent gel compound does not directly supports the rider's hips, therefore the shock absorbing function of the first layer of uniformly transparent gel compound cannot be fully carried out. Further, this support structure is complicated, resulting in high manufacturing cost.

The U.S. Pat. No. 6,450,572 also discloses a prior art bicycle saddle which comprises a rigid base plate and located on top of the base plate in proper order a relatively hard and firm resilient material, a relatively soft resilient material, and a gel material. This bicycle saddle provides a comfortable cushion to the rider. However, because the gel material is directly disposed on the uneven top surface of the relatively soft resilient material and the saddle normally must have a smooth top surface, the thickness of the gel material is changed subject to the uneven top surface of the relatively soft resilient material. This structure causes the gel material unable to achieve the expected shock-absorbing function.

SUMMARY OF THE INVENTION

It is therefore the primary object of the present invention to provide a bicycle saddle, which provides satisfactory shock-absorbing and supporting effects, giving a comfort ride.

To achieve this and other objects of the present invention, the bicycle saddle of the present invention has a narrow nose and a broad rear portion backwardly extended from said narrow nose. The bicycle saddle further comprises a shell having top and bottom surfaces. A first elastic layer made of a foamed plastic material is disposed on the top surface of said shell. A first covering layer completely covers on said first elastic layer. A second elastic layer is disposed on said first covering layer. The second elastic layer comprises a gel layer located on top of said first covering layer and a second covering layer completely covering on said gel layer.

The present invention will be better understood and additional objectives and advantages will become apparent from the following description taken in connection with the accompanying drawings, wherein:

DETAILED DESCRIPTION OF THE INVENTION

Figure 1:
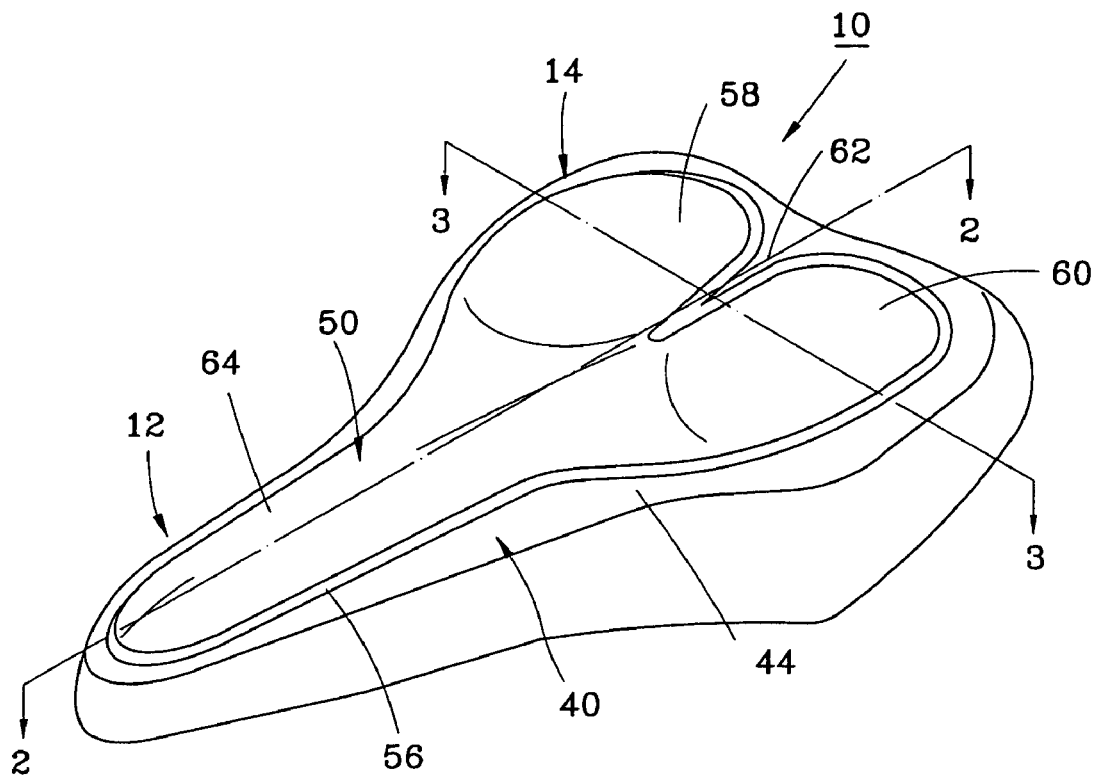
FIG. 1 is a perspective view of a bicycle saddle according to the first embodiment of the present invention.
Figure 2:
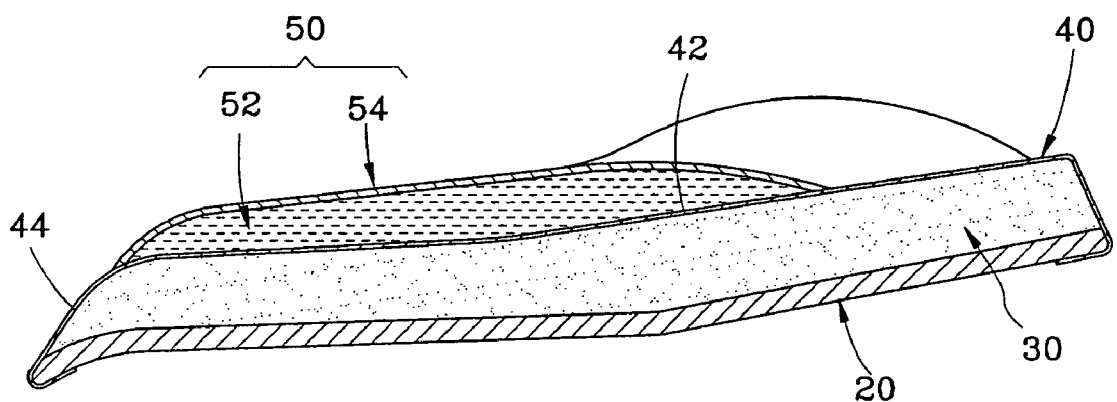
FIG. 2 is a sectional view taken along line 2—2 of FIG. 1.
Figure 3:
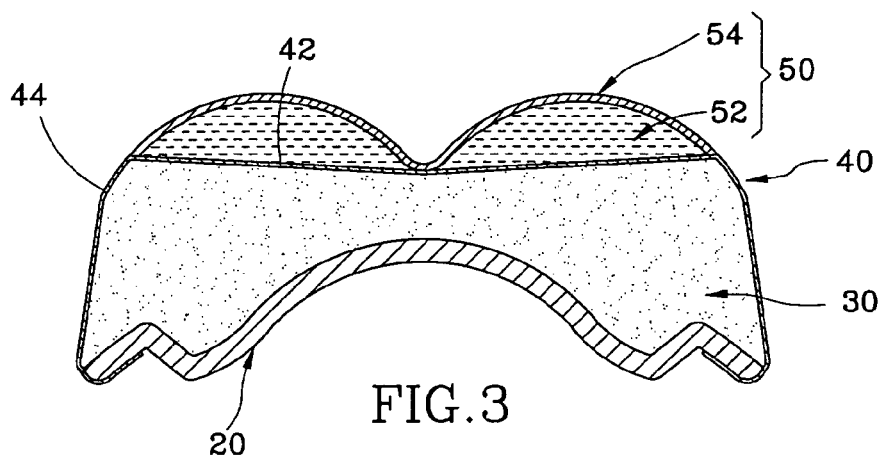
FIG. 3 is a sectional view taken along line 3—3 of FIG. 1.

First, referring to FIGS. 1–3, the outer appearance of a bicycle saddle 10 in accordance with the first embodiment of the present invention is substantially similar conventional bicycle saddles that have a narrow front nose 12 and a broad rear portion 14.

The saddle 10 includes a shell 20 molded from hard plastics to support the whole saddle, which has top and bottom surfaces. A first elastic layer 30 is molded from foamed plastic material and arranged at the top surface of the shell 20. A first covering layer 40 is made of plastic or fabric sheet material or any of a variety of leathers and closely bonded to the top surface and periphery of the first elastic layer 30 and peripherally fixedly secured to the bottom surface of the bottom shell 20. The first covering layer 40 has a smooth top surface.

The saddle 10 further comprises a second elastic layer 50 including a gel layer 52 and a second covering layer 54. The gel layer 52 can be silicon gel or polyurethane gel that deforms subject to the weight of the rider. The gel layer 52 is disposed on the top surface of the first covering layer 40, and protruded beyond the first covering layer 40 a predetermined height. The second covering layer 54 is formed of a plastic sheet material and covered on the whole surface of the gel layer 52, having a periphery 56 bonded to the top surface of the first covering layer 40.

In addition, the second elastic layer 50 comprises two rear mounds 58 and 60 bilaterally symmetrically disposed at the broad rear portion 14, a groove 62 formed between the rear mounds 58 and 60, and a front mound 64 disposed at the front nose 12. The rear mounds 58 and 60 have a front end joined together. The front mound 64 has a rear end connected with the front ends.

Further, the first covering layer 40 has an inner part 42 covered by the second elastic layer 50, and an outer part 44 exposed to the outside of the second elastic layer 50. The inner part 42 and the outer part 44 can be made having different colors. The gel layer 52 and the second covering layer 54 are respectively made of transparent (or semitransparent) materials so that the color of the inner part 42 of the first covering 40 can be seen from the outside of the bicycle saddle 10.

Based on the aforesaid structural arrangement, the advantages of the invention are outlined hereinafter. When the user is riding on the bicycle saddle 10, the hips are directly rested on the second elastic layer 50. At this time, the first elastic layer 30 absorb shocks, and the second elastic layer 50 evenly distribute the pressure from the rider through the first elastic layer 30, therefore the bicycle saddle 10 supports the rider stably. Further, because the gel layer 52 is deformable subject to the weight and shape of the rider's hips, the bicycle saddle 10 provides a comfort ride. More particularly, in the present invention, the gel layer 52 is arranged at the smooth top surface of the first covering layer 40, therefore, the thickness of the first covering layer 40 can uniformly distribute over the whole area thereof. The result is that the gel layer 52 will deform subject to the weight and shape the rider's hips, enabling the function of the gel layer 52 to be fully carried out.

Figure 4:
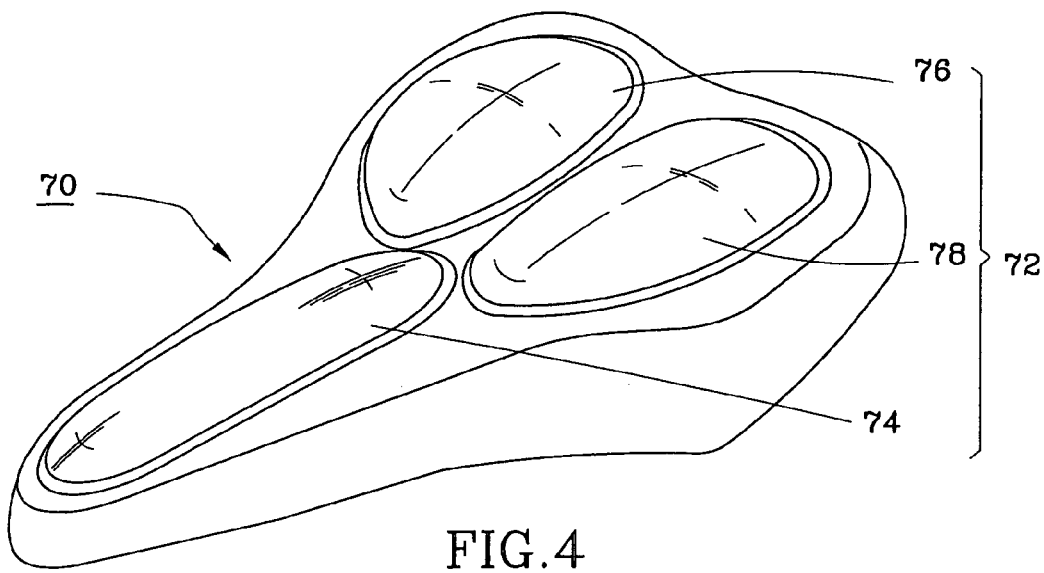
FIG. 4 is a perspective view of a bicycle saddle according to the second embodiment of the present invention.
Figure 5:
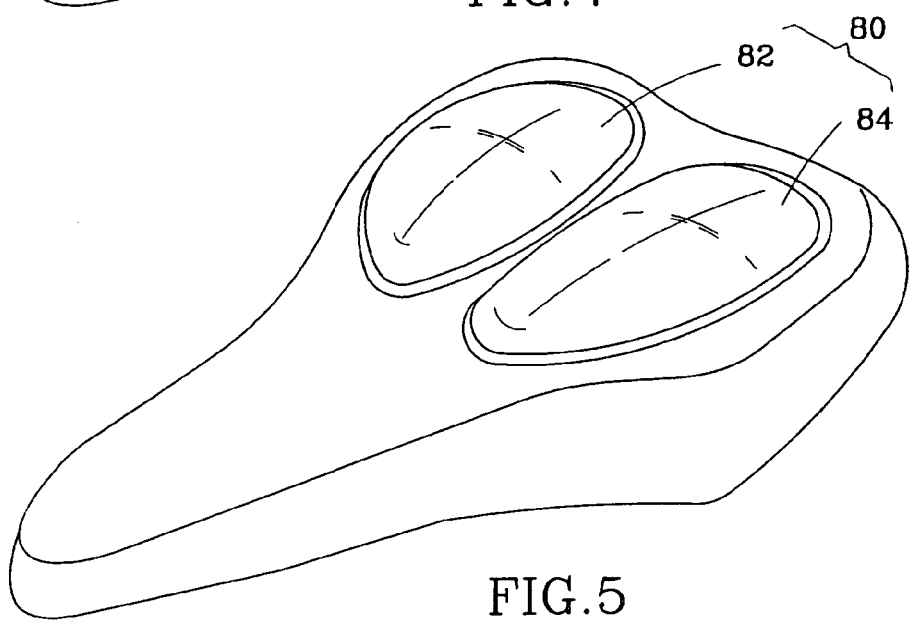
FIG. 5 is a perspective view of a bicycle saddle according to the third embodiment of the present invention.

The arrangement of the second elastic layer is not limited to the aforesaid first embodiment of the present invention. FIG. 4 shows a bicycle saddle 70 constructed according to the second embodiment of the present invention. According to this embodiment, the second elastic layer 72 of the bicycle saddle 70 has independent front mound 74, rear left mound 76, and rear right mound 78. FIG. 5 shows a bicycle saddle constructed according to the third embodiment of the present invention. According to this embodiment, the second elastic layer 80 has only a rear left mound 82 and a rear right mound 84.

What is claimed is:

1. A bicycle saddle having a narrow nose and a broad rear portion backwardly extended from said narrow nose, the bicycle saddle comprising:
   a shell having top and bottom surfaces;
   a first elastic layer made of a foamed plastic material and disposed on the top surface of said shell;
   a first covering layer formed as a unit from a single material entirely covering said first elastic layer and having a smooth top surface; and
   a second elastic layer disposed on said first covering layer, said second elastic layer comprising a gel layer disposed on the top surface of said first covering layer and a second covering layer formed separately from said first covering surface entirely covering said gel layer and engaged to said first covering layer.

2. The bicycle saddle as claimed in claim 1, wherein the second elastic layer projects up from the first covering layer a predetermined height.

3. The bicycle saddle as claimed in claim 1, wherein said second covering layer is made of transparent material.

4. The bicycle saddle as claimed in claim 3, wherein said gel layer is made of transparent gel material.

5. The bicycle saddle as claimed in claim 4, wherein said first covering layer has an inner part covered by said second elastic layer, said inner part having a first color, and an outer part exposed outside said second elastic layer and having a second color.

6. The bicycle saddle as claimed in claim 1, wherein said second elastic layer comprises two rear mounds bilaterally symmetrically disposed at said broad rear portion.

7. The bicycle saddle as claimed in claim 6, wherein said second elastic layer further comprises a front mound disposed on said nose.

8. The bicycle saddle as claimed in claim 7, wherein both said rear mounds have a front end joined to each other, said front mound has a rear end connected with said front ends of said rear mounds.

* * * * *